US010480624B2

(12) United States Patent
Kwon et al.

(10) Patent No.: US 10,480,624 B2
(45) Date of Patent: Nov. 19, 2019

(54) MULTI-STAGE TRANSMISSION FOR VEHICLE

(71) Applicants: Hyundai Motor Company, Seoul (KR); Kia Motors Corporation, Seoul (KR)

(72) Inventors: Hyun Sik Kwon, Seoul (KR); Seong Wook Hwang, Gyeonggi-do (KR); Ki Tae Kim, Incheon (KR); Won Min Cho, Gyeonggi-do (KR); Jae Chang Kook, Gyeonggi-do (KR); Seong Wook Ji, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 72 days.

(21) Appl. No.: 15/826,501

(22) Filed: Nov. 29, 2017

(65) Prior Publication Data

US 2019/0078660 A1     Mar. 14, 2019

(30) Foreign Application Priority Data

Sep. 11, 2017  (KR) .......................... 10-2017-0115688

(51) Int. Cl.
    *F16H 3/66*     (2006.01)
(52) U.S. Cl.
    CPC ..... *F16H 3/663* (2013.01); *F16H 2200/0073* (2013.01); *F16H 2200/201* (2013.01); *F16H 2200/2012* (2013.01); *F16H 2200/2023* (2013.01); *F16H 2200/2046* (2013.01)

(58) Field of Classification Search
    CPC combination set(s) only.
    See application file for complete search history.

(56) References Cited

U.S. PATENT DOCUMENTS

| 7,291,086 B2 * | 11/2007 | Park | F16H 3/663 |
| | | | 475/284 |
| 2003/0186775 A1 * | 10/2003 | Ishimasu | F16H 3/66 |
| | | | 475/275 |
| 2014/0213402 A1 * | 7/2014 | Wilton | F16H 3/62 |
| | | | 475/5 |
| 2016/0368360 A1 * | 12/2016 | Ziemer | B60K 6/445 |

FOREIGN PATENT DOCUMENTS

KR     2013-0003981 A     1/2013

* cited by examiner

*Primary Examiner* — Timothy Hannon
(74) *Attorney, Agent, or Firm* — Mintz Levin Cohn Ferris Glovsky and Popeo, P.C.; Peter F. Corless

(57) ABSTRACT

A multi-stage transmission for a vehicle includes: a first planetary gear set and a second planetary gear set each including three rotating elements; a compound planetary gear set including four rotating elements; and eight rotation shafts connected to the rotating elements of the planetary gear sets.

4 Claims, 2 Drawing Sheets

FIG. 2

| GEAR STEP | B1 | B2 | CL1 | CL2 | CL3 | CL4 | GEAR RATIO |
|---|---|---|---|---|---|---|---|
| 1 |  | ● | ● |  | ● |  | 6.357 |
| 2 |  | ● |  |  | ● | ● | 5.567 |
| 3 |  | ● | ● |  |  | ● | 4.875 |
| 4 | ● | ● | ● |  |  |  | 4.167 |
| 5 | ● |  | ● |  |  | ● | 2.879 |
| 6 | ● |  |  |  | ● | ● | 2.473 |
| 7 | ● |  |  | ● |  | ● | 1.667 |
| 8 | ● |  | ● | ● |  |  | 1.466 |
| 9 | ● |  |  | ● | ● |  | 1.129 |
| 10 |  |  | ● | ● | ● |  | 1.000 |
| 11 |  | ● |  | ● | ● |  | 0.400 |
| REV. |  | ● | ● | ● |  |  | −4.813 |

MULTI-STAGE TRANSMISSION FOR VEHICLE

CROSS REFERENCE TO RELATED APPLICATION

The present application claims under 35 U.S.C. § 119(a) the benefit of Korean Patent Application No. 10-2017-0115688, filed Sep. 11, 2017, the entire contents of which are incorporated by reference herein.

BACKGROUND

(a) Technical Field

The present disclosure relates to a multi-stage transmission for a vehicle, more particularly, to a multi-stage transmission capable of improving fuel efficiency by implementing as many shifting stages as possible with a reduced number of components arranged in a simple configuration.

(b) Description of the Related Art

In an environment in which oil prices are unpredictable, automobile manufacturers throughout the world have competed to improve fuel efficiency. Engine research has focused on improving fuel efficiency while decreasing weight by use of novel technology to enable downsizing, or the like, of engine components.

Meanwhile, among methods of improving fuel efficiency that are realized by a transmission mounted in a vehicle, there is a method of allowing an engine to be driven at a more efficient driving point through a multi-stage transmission to ultimately improve fuel efficiency.

In addition, the multi-stage transmission as described above may allow the engine to be driven in a relatively low revolution per minute (RPM) band to reduce noise of the vehicle.

However, as shifting stages of the transmission are increased, the number of internal components of the transmission is increased, such that a mounting feature and transfer efficiency may be deteriorated, and a cost and weight may be increased. Therefore, in order to maximize a fuel efficiency improving effect through the multi-stage transmission, it is important to devise a transmission structure capable of deriving maximum efficiency by a reduced number of components and a comparatively simple configuration.

The foregoing is intended merely to aid in the understanding of the background of the present disclosure, and is not intended to mean that the present disclosure falls within the purview of the related art that is already known to those skilled in the art.

SUMMARY

Accordingly, the present disclosure discloses a multi-stage transmission for a vehicle, the multi-stage transmission capable of improving fuel efficiency of a vehicle by implementing as many shifting stages as possible with a reduced number of components, i.e., as few components as possible, and in a simple configuration.

In order to achieve the above object, according to one aspect of the present disclosure, there is provided a multi-stage transmission for a vehicle, the multi-stage transmission including: a first planetary gear set PG1 and a second planetary gear set PG2 each including three rotating elements; a compound planetary gear set CPG including four rotating elements; and eight rotation shafts connected to the rotating elements of the planetary gear sets, wherein a first rotation shaft A1 is connected directly to a first rotating element of the first planetary gear set PG1, a second rotation shaft A2 is an input shaft IN connected directly to a second rotating element of the first planetary gear set PG1, a third rotation shaft A3 is connected directly to both a third rotating element of the first planetary gear set PG1 and a first rotating element of the second planetary gear set PG2, a fourth rotation shaft A4 is connected directly to a first rotating element of the compound planetary gear set CPG, a fifth rotation shaft A5 is an output shaft OUT connected directly to both a third rotating element of the compound planetary gear set CPG and a third rotating element of the second planetary gear set PG2, a sixth rotation shaft A6 is connected directly to a fourth rotating element of the compound planetary gear set CPG, a seventh rotation shaft A7 is connected directly to a second rotating element of the compound planetary gear set CPG, and an eighth rotation shaft A8 is connected directly to a second rotating element of the second planetary gear set PG2.

The multi-stage transmission may further include: four clutches connecting two of the eight rotation shafts to each other; and two brakes selectively connecting shafts of the eight rotation shafts without being connected to the input shaft IN or the output shaft OUT, to a transmission housing CS.

A first clutch CL1 of the four clutches may be provided between the second rotation shaft A2 and the seventh rotation shaft A7, a second clutch CL2 may be provided between the third rotation shaft A3 and the sixth rotation shaft A6, a third clutch CL3 may be provided between the first rotation shaft A1 and the fourth rotation shaft A4, and a fourth clutch CL4 may be provided between the sixth rotation shaft A6 and the eighth rotation shaft A8; and a first brake B1 of the two brakes may be provided between the first rotation shaft A1 and the transmission housing CS, and a second brake B2 may be provided between the eighth rotation shaft A8 and the transmission housing CS.

The first, the second, and the third rotating elements of the first planetary gear set PG1 may be a first sun gear S1, a first carrier C1, and a first ring gear R1, respectively; the first, the second, the third, and the fourth rotating elements of the compound planetary gear set CPG may be a second sun gear S2, a third sun gear S3, a single second and third carrier C2-3, and a second ring gear R2, respectively; and the first, the second, and the third rotating elements of the second planetary gear set PG1 may be a fourth sun gear S4, a fourth carrier C4, and a fourth ring gear R4, respectively.

The first planetary gear set PG1 and the second planetary gear set PG2 may be of a double pinion type planetary gear set, and the third rotating element of the compound planetary gear set CPG may be connected to the first rotating element in a double pinion type and be connected to the second rotating element in a single pinion type.

According to the multi-stage transmission for a vehicle configured as described above, the gear ratio of eleven forward gears and one reverse gear is realized by combining two planetary gear sets and one compound planetary gear set, whereby it is possible to reduce the package volume of the automatic transmission.

Accordingly, by making shifting stages of the automatic transmission multi-stages, it is possible to improve fuel efficiency, and it is also possible to improve silence of the vehicle during drive by allowing an engine to be driven in a low revolution per minute (RPM) band.

BRIEF DESCRIPTION OF THE DRAWINGS

The above and other objects, features and other advantages of the present disclosure will be more clearly understood from the following detailed description when taken in conjunction with the accompanying drawings, in which:

FIG. 2 is an operation mode table of the multi-stage transmission of FIG. 1 according to the embodiment of the present disclosure.

DETAILED DESCRIPTION OF THE DISCLOSURE

Figure 1:
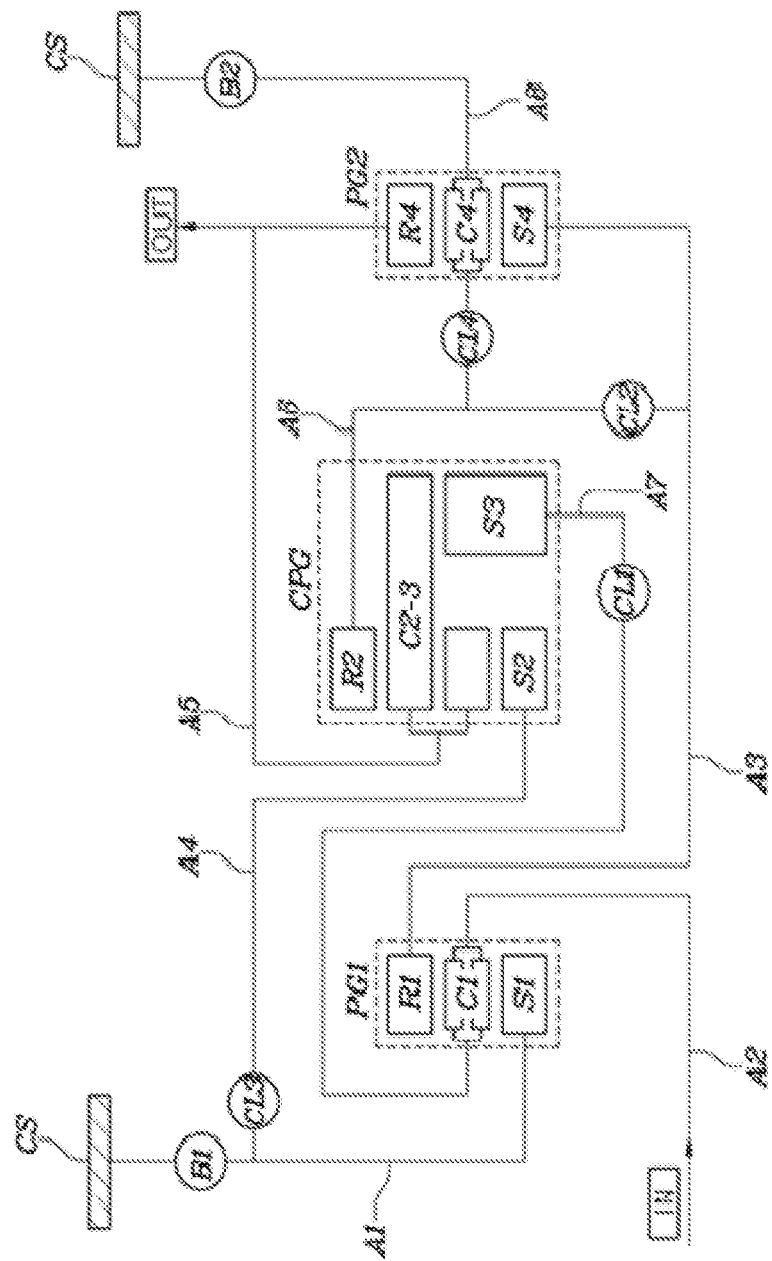
FIG. 1 is a schematic view showing a configuration of a multi-stage transmission for a vehicle according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinbelow, a multi-stage transmission for a vehicle according to an exemplary embodiment of the present disclosure will be described in detail with reference to the accompanying drawings.

FIG. 1 is a schematic view showing a configuration of a multi-stage transmission for a vehicle according to an embodiment of the present disclosure; and FIG. 2 is an operation mode table of the multi-stage transmission of FIG. 1 according to the embodiment of the present disclosure.

Firstly, referring to FIG. 1, a multi-stage transmission for a vehicle of the present disclosure includes: a first planetary gear set PG1 and a second planetary gear set PG2 each including three rotating elements; a compound planetary gear set CPG including four rotating elements; and eight rotation shafts connected to the rotating elements of the planetary gear sets.

A first rotation shaft A1 is connected directly to a first rotating element S1 of the first planetary gear set PG1; a second rotation shaft A2 is an input shaft IN connected directly to a second rotating element C1 of the first planetary gear set PG1; a third rotation shaft A3 is connected directly to both a third rotating element R1 of the first planetary gear set PG1 and a first rotating element S4 of the second planetary gear set PG2; a fourth rotation shaft A4 is connected directly to a first rotating element S2 of the compound planetary gear set CPG; a fifth rotation shaft A5 is an output shaft OUT connected directly to both a third rotating element C2-3 of the compound planetary gear set CPG and a third rotating element R4 of the second planetary gear set PG2; a sixth rotation shaft A6 is connected directly to a fourth rotating element R2 of the compound planetary gear set CPG; a seventh rotation shaft A7 is connected directly to a second rotating element S2 of the compound planetary gear set CPG; and an eighth rotation shaft A8 is connected directly to a second rotating element C4 of the second planetary gear set PG2.

Herein, the first, the second, and the third rotating elements of the first planetary gear set PG1 are a first sun gear S1, a first carrier C1, and a first ring gear R1, respectively; the first, the second, the third, and the fourth rotating elements of the compound planetary gear set CPG are a second sun gear S2, a third sun gear S3, a second and third carrier C2-3, and a second ring gear R2, respectively; and the first, the second, and the third rotating elements of the second planetary gear set PG1 are a fourth sun gear S4, a fourth carrier C4, and a fourth ring gear R4, respectively.

In particular, the first planetary gear set PG1 and second planetary gear set PG2 are of a double pinion type planetary gear set; and the third rotating element C2-3 of the compound planetary gear set CPG is connected to the first rotating element S2 in a double pinion type, and is connected to the second rotating element S3 in a single pinion type. This is generally referred to as a Ravigneaux planetary gear device.

The multi-stage transmission further includes: four clutches connecting two of the eight rotation shafts to each other; and two brakes selectively connecting shafts of the eight rotation shafts without being connected to the input shaft IN or the output shaft OUT, to a transmission housing CS.

In particular, a first clutch CL1 of the four clutches is provided between the second rotation shaft A2 and the seventh rotation shaft A7, a second clutch CL2 is provided between the third rotation shaft A3 and the sixth rotation shaft A6, a third clutch CL3 is provided between the first rotation shaft A1 and the fourth rotation shaft A4, and a fourth clutch CL4 is provided between the sixth rotation shaft A6 and the eighth rotation shaft A8.

A first brake B1 of the two brakes is provided between the first rotation shaft A1 and the transmission housing CS, and a second brake B2 is provided between the eighth rotation shaft A8 and the transmission housing CS.

In other words, the first brake B1 and the second brake B2 serve to restrict or release rotations of the first rotating element S1 of the first planetary gear set PG1 and the second rotating element C4 of the second planetary gear set PG2, respectively.

FIG. 2 shows a method of realizing a gear ratio of eleven forward gears and one reverse gear by controlling the four clutches and the two brakes.

According to the multi-stage transmission for a vehicle configured as described above, the gear ratio of eleven forward gears and one reverse gear is realized by combining two planetary gear sets and one compound planetary gear set, whereby it is possible to reduce the package volume of the automatic transmission.

Accordingly, by making shifting stages of the automatic transmission multi-stages, it is possible to improve fuel efficiency, and it is also possible to improve silence of the vehicle during drive by allowing an engine to be driven in a low revolution per minute (RPM) band.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A multi-stage transmission for a vehicle, the multi-stage transmission comprising:
    a first planetary gear set and a second planetary gear set each including a first rotating element, a second rotating element, and a third rotating element;
    a compound planetary gear set including a first rotating element, a second rotating element, a third rotating element, and a fourth rotating element; and
    eight rotation shafts connected to the rotating elements of the planetary gear sets,
    wherein a first rotation shaft of the eight rotation shafts is connected directly to the first rotating element of the first planetary gear set,
    a second rotation shaft of the eight rotation shafts is an input shaft connected directly to the second rotating element of the first planetary gear set,
    a third rotation shaft of the eight rotation shafts is connected directly to both the third rotating element of the first planetary gear set and the first rotating element of the second planetary gear set,
    a fourth rotation shaft of the eight rotation shafts is connected directly to the first rotating element of the compound planetary gear set,
    a fifth rotation shaft of the eight rotation shafts is an output shaft connected directly to both the third rotating element of the compound planetary gear set and the third rotating element of the second planetary gear set,
    a sixth rotation shaft of the eight rotation shafts is connected directly to the fourth rotating element of the compound planetary gear set,
    a seventh rotation shaft of the eight rotation shafts is connected directly to the second rotating element of the compound planetary gear set, and
    an eighth rotation shaft of the eight rotation shafts is connected directly to the second rotating element of the second planetary gear set.

2. The multi-stage transmission of claim 1, further comprising four clutches and two brakes, wherein a first clutch of the four clutches is provided between the second rotation shaft and the seventh rotation shaft, a second clutch of the four clutches is provided between the third rotation shaft and the sixth rotation shaft, a third clutch of the four clutches is provided between the first rotation shaft and the fourth rotation shaft, and a fourth clutch of the four clutches is provided between the sixth rotation shaft and the eighth rotation shaft, and
    a first brake of the two brakes is provided between the first rotation shaft and the transmission housing, and a second brake of the two brakes is provided between the eighth rotation shaft and the transmission housing.

3. The multi-stage transmission of claim 1, wherein the first, the second, and the third rotating elements of the first planetary gear set are a first sun gear, a first carrier, and a first ring gear, respectively,
    the first, the second, the third, and the fourth rotating elements of the compound planetary gear set are a second sun gear, a third sun gear, a second and third carrier, and a second ring gear, respectively, and
    the first, the second, and the third rotating elements of the second planetary gear set are a fourth sun gear, a fourth carrier, and a fourth ring gear, respectively.

4. The multi-stage transmission of claim 3, wherein the first planetary gear set and the second planetary gear set are of a double pinion type planetary gear set, and
    the third rotating element of the compound planetary gear set is connected to the first rotating element in a double pinion type, and is connected to the second rotating element in a single pinion type.

\* \* \* \* \*